(12) United States Patent
Sun et al.

(10) Patent No.: US 12,012,256 B2
(45) Date of Patent: Jun. 18, 2024

(54) DEHUMIDIFICATION BAG AND PREPARATION METHOD THEREOF

(71) Applicant: ZHEJIANG GOLDSTONE PACKAGING CO., LTD., Wenzhou (CN)

(72) Inventors: Guojin Sun, Wenzhou (CN); Can Chen, Wenzhou (CN); Wenming Zeng, Wenzhou (CN); Zhigang Xie, Wenzhou (CN); Miao Ren, Wenzhou (CN)

(73) Assignee: ZHEJIANG GOLDSTONE PACKAGING CO., LTD. (CN)

( * ) Notice: Subject to any disclaimer, the term of this patent is extended or adjusted under 35 U.S.C. 154(b) by 0 days.

(21) Appl. No.: 17/057,312

(22) PCT Filed: Sep. 16, 2020

(86) PCT No.: PCT/CN2020/115569
§ 371 (c)(1),
(2) Date: Nov. 20, 2020

(87) PCT Pub. No.: WO2021/243883
PCT Pub. Date: Dec. 9, 2021

(65) Prior Publication Data
US 2023/0081227 A1   Mar. 16, 2023

(30) Foreign Application Priority Data
Jun. 3, 2020 (CN) .......................... 202010497330.1

(51) Int. Cl.
*B65D 33/01* (2006.01)
*B32B 3/08* (2006.01)
(Continued)

(52) U.S. Cl.
CPC ................ *B65D 33/01* (2013.01); *B32B 3/08* (2013.01); *B32B 5/022* (2013.01); *B32B 7/12* (2013.01);
(Continued)

(58) Field of Classification Search
CPC .. B65D 33/01; B65D 33/2508; B65D 75/008; B32B 3/08; B32B 5/022; B32B 7/12;
(Continued)

(56) References Cited

U.S. PATENT DOCUMENTS 5,322,161 A * 6/1994 Shichman ............ B65D 81/266
206/204
2021/0107714 A1 * 4/2021 Hiraoka ................ B65D 33/01

FOREIGN PATENT DOCUMENTS

CN        2609848 Y       4/2004
CN        204355501 U     5/2015
(Continued)

OTHER PUBLICATIONS

China National Intellectual Property Adminstration; International Search Report and Written Opinion issued in PCT/CN2020/115569 dated Feb. 18, 2021, 18 pages.

*Primary Examiner* — Peter N Helvey
(74) *Attorney, Agent, or Firm* — MASCHOFF BRENNAN

(57) ABSTRACT

The present invention relates to a dehumidification bag and a preparation method thereof. The dehumidification bag comprises a bag body including a first side sheet and a second side sheet, the side sheet comprises an air-permeability and/or a composite film, wherein at least all or part of at least one side sheet is an air-permeability film; a moisture-proof layer covers the outside of the air-permeability. The dehumidification bag provided by the present invention provides an air-permeability on the bag body, and
(Continued)

adopts heat sealing between the outer surface of the air-permeability layer and the moisture-proof layer, so that the air-permeability and the moisture-proof layer are in close contact without moisture absorption, which effectively prevents damage during transportation and storage. In the process, the air-permeability is in contact with the air in the outer bag and the effect of the dehumidifier becomes poor or invalid; by setting the moisture-proof layer to be tearable, when the buyer uses the dehumidification bag, the moisture-proof layer can be torn off, which is convenient and fast.

9 Claims, 4 Drawing Sheets

(51) Int. Cl.
| | | |
|---|---|---|
| B32B 5/02 | (2006.01) | |
| B32B 7/12 | (2006.01) | |
| B32B 15/09 | (2006.01) | |
| B32B 15/20 | (2006.01) | |
| B32B 27/08 | (2006.01) | |
| B32B 27/12 | (2006.01) | |
| B32B 27/32 | (2006.01) | |
| B32B 27/34 | (2006.01) | |
| B32B 27/36 | (2006.01) | |
| B32B 37/12 | (2006.01) | |
| B32B 38/00 | (2006.01) | |
| B65D 33/25 | (2006.01) | |
| B65D 75/00 | (2006.01) | |

(52) U.S. Cl.
CPC ............. *B32B 15/09* (2013.01); *B32B 15/20* (2013.01); *B32B 27/08* (2013.01); *B32B 27/12* (2013.01); *B32B 27/32* (2013.01); *B32B 27/34* (2013.01); *B32B 27/36* (2013.01); *B32B 37/1207* (2013.01); *B32B 38/164* (2013.01); *B65D 33/2508* (2013.01); *B65D 75/008* (2013.01); *B32B 2255/10* (2013.01); *B32B 2255/205* (2013.01); *B32B 2262/0253* (2013.01); *B32B 2307/31* (2013.01); *B32B 2307/724* (2013.01); *B32B 2307/7246* (2013.01); *B32B 2307/732* (2013.01); *B32B 2309/02* (2013.01); *B32B 2311/24* (2013.01); *B32B 2323/04* (2013.01); *B32B 2323/10* (2013.01); *B32B 2367/00* (2013.01); *B32B 2377/00* (2013.01); *B32B 2439/06* (2013.01)

(58) Field of Classification Search
CPC ......... B32B 15/09; B32B 15/20; B32B 27/08; B32B 27/12; B32B 27/32; B32B 27/34; B32B 27/36; B32B 37/1207; B32B 38/164
USPC ............................................................ 383/63
See application file for complete search history.

(56) References Cited

FOREIGN PATENT DOCUMENTS

| CN | 205470462 U | 8/2016 |
|---|---|---|
| CN | 206407330 U | 8/2017 |
| CN | 207105807 U | 3/2018 |
| CN | 208232526 U | 12/2018 |
| JP | 2004067148 A | 3/2004 |

* cited by examiner

DEHUMIDIFICATION BAG AND PREPARATION METHOD THEREOF

CROSS-REFERENCE TO RELATED APPLICATION

This application claims priority benefits to Chinese Patent Application No. 202010497330.1, filed on Jun. 3, 2020, with the title of "a dehumidification bag and a preparation method thereof". The contents of all of the aforementioned applications are incorporated herein by reference.

TECHNICAL FIELD

The present invention relates to the technical field of dehumidification packaging, in particular to a dehumidification bag and a preparation method thereof.

BACKGROUND

June and July of each year is the rainy season in central and southern of China. Due to abundant rainfall, evaporation in surface is enhanced, air humidity is high, and temperature is high, thus the reproduction and growth rate of mold is significantly increased, making the clothes in the wardrobe particularly prone to mold, having not only unpleasant smell but also mildew.

In order to prevent the clothes from getting moldy, people often put dehumidifiers in the wardrobe. The most widely used dehumidification packaging on the market is a composite packaging bag with a hook, and the composite packaging bag is generally composed of an outer bag, an inner bag body, a hook and a fixed clip. The hook is arranged on an upper part of the fixed clip. The materials used for the hook and the fixed clip are plastics. The fixed clip is used to clamp the bag desiccant feeding inlet. The inner bag body is composed of an upper layer of desiccant bag (usually non-woven material) and a lower layer of moisture-absorbing water bag through sealing combination. The bottom of the upper layer of desiccant bag is provided with a number of penetration holes, and the air-permeable through-holes are arranged on both sides of the bag body surface, and the bag body is hung in the wardrobe.

Although the above dehumidification bag has a certain dehumidification effect, however, due to the double-layer structure design of the inner bag and outer bag, when dehumidifier is fed into the bag, the upper layer of desiccant bag made of non-woven fabric has only one protective layer(namely the outer bag) during storage, and the non-woven fabric has air-permeability, the desiccant can absorb the moisture in the air in the outer bag through permeable non-woven fabric after feeding the dehumidifier, causing the effect of the dehumidifier to deteriorate or fail.

SUMMARY OF THE INVENTION

Therefore, the present invention aims to overcome the defect in the prior art that the dehumidification bag containing dehumidifier absorbs the moisture in the air in the outer bag during storage and transportation, which will cause the effect of the dehumidifier to deteriorate or fail, and further to provide a dehumidification bag and a preparation method thereof.

For this purpose, the present application provides the following technical solutions:

A dehumidification bag comprises: a bag body, comprising a first side sheet and a second side sheet, wherein the side sheet comprises an air-permeability film and/or a composite film, wherein, part or all of at least one side sheet is the air-permeability film; a storage compartment formed by heat sealing the first side sheet and the second side sheet; and a moisture-proof layer, covering an outside of the air-permeability film, and the moisture-proof layer is tearable.

Further, the bag body further comprises a bottom sheet, which is heat-sealed together with the first side sheet and the second side sheet to form the storage compartment. When the dehumidification bag comprises a bottom sheet, it can be self-standing, and is also called a dehumidification stand-up bag.

Further, the bag body is provided with an openable and closeable sealing structure, which may be a zipper or a sealing strip, etc.

Further, the moisture-proof layer comprises a reinforcing layer and a barrier layer; preferably, the barrier layer is a thin film layer of polyethylene terephthalate; the reinforcement layer is an aluminum foil layer, an aluminized polyester film layer or a thin film layer formed by aluminum foil and polyethylene terephthalate; and the air-permeability film is a non-woven fabric or Tyvek.

A pattern layer can be provided on one side or both sides of the barrier layer; some words or pattern descriptions related to the product can be displayed on the pattern layer, which is convenient for consumers to understand.

Further, the barrier layer has a thickness ranging from 12 µm to 50 µm.

The composite film may be a conventional composite film, such as a polyethylene film, etc. Further preferably, the composite film comprises a heat-seal layer, an adhesive layer, an ink layer, and a printing layer in sequence from inside to outside; preferably, the heat-seal layer is a polyethylene layer or a cast polypropylene layer; and the printing layer is a thin film layer of polyethylene terephthalate and/or a polyamide layer.

Further, the adhesive layer has a thickness ranging from 1 µm to 3 µm; the ink layer has a thickness of less than 3 µm; the heat-seal layer has a thickness ranging from 30 µm to 150 µm; and the printing layer has a thickness ranging from 12 µm to 50 µm.

Further, an easy-to-pull structure is provided on the moisture-proof layer. The easy-to-pull structure extends out of a heat-sealed end, which can be square, rectangular, arc-shaped, oval, etc.

The present application also provides a method for preparing a dehumidification bag, comprising the following steps: heat-sealing a moisture-proof layer with a first side sheet and a second side sheet to obtain a dehumidification bag, wherein, the side sheet consists of an air-permeability film and/or a composite film, part or all of at least one side sheet is an air-permeability film; and the moisture-proof layer is located on the outside of the air-permeability film.

When all of one side sheet is an air-permeability film, all of the side sheet that is air-permeability film is arranged between the side sheet of the composite film and the moisture-proof layer, and then heat sealing is carried out to obtain the dehumidification bag. A storage compartment for containing the dehumidifier is formed between the air-permeability film and the composite film.

When both side sheets are air-permeability films, the two air-permeability films are arranged between the two moisture-proof layers, and then heat-sealing is carried out to obtain the dehumidification bag. A storage compartment for containing the dehumidifier is formed between the two breathable films.

When part of one side sheet is an air-permeability film, the air-permeability film overlaps the composite film to form a composite side sheet (that is, the composite side sheet is composed of the air-permeability film and the composite film), and the air-permeability film of the overlapping part is located inside of the composite film. Then composite side sheet is heat-sealed with the other side sheet and the moisture-proof layer to obtain the dehumidification bag. When subjected to heat-sealing, the moisture-proof layer is located on the side of the air-permeability film away from the other side sheet. A storage compartment for containing the dehumidifier is formed between the composite side sheet and the side sheet of which all is composite film.

When part of the two side sheets is an air-permeability film, the air-permeability film overlaps the composite film to form a composite side sheet (that is, the composite side sheet is composed of the air-permeability film and the composite film), and the air-permeability film of the overlapping part is located inside of the composite film, then the two composite side sheets are heat-sealed with the moisture-proof layer to obtain the dehumidification bag. The moisture-proof layer is located on the side of the air-permeability film away from the other composite side sheet. A storage compartment for containing the dehumidifier is formed between the two composite side sheets.

Further, during the heat-sealing, firstly, transverse heat-sealing is performed, and then longitudinal heat-sealing is performed to form two side heat-sealing edges.

Further, the bag body further comprises a bottom sheet, and the dehumidification bag is obtained by heat-sealing the moisture-proof layer, the bottom sheet, the first side sheet and the second side sheet. The bottom sheet can be any shape such as an oval, a circular shape, etc. that can support the bag body to achieve self-standing.

Further, the heat-sealing is carried out at a temperature ranging from 130° C. to 220° C. for a time period from 0.5 s to 1 s.

Further, there is a step of coating a hot-seal adhesive on the moisture-proof layer before heat sealing; wherein, the hot-seal adhesive is coated with a speed of less than or equal to 200 m/min; when coating the hot-seal adhesive, a first drying tunnel is maintained at a temperature ranging from 70° C. to 90° C., a second drying tunnel is maintained at a temperature ranging from 80° C. to 120° C., and a third drying tunnel is maintained at a temperature ranging from 90° C. to 150° C.; and the hot-seal adhesive is coated in an amount of 3 g/m$^2$ to 6 g/m$^2$ after drying.

Further, the moisture-proof layer comprises a reinforcing layer and a barrier layer from inside to outside; the composite film comprises a heat-seal layer, an adhesive layer, an ink layer, and a printing layer in sequence from inside to outside; and the method further comprises a step of printing an ink pattern on the barrier layer and/or the printing layer at a printing speed ranging from 100 m/min to 300 m/min and a drying temperature ranging from 40° C. to 80° C.

Further, the moisture-proof layer is prepared by compounding the barrier layer printed with the ink pattern with the reinforcing layer, and curing; and the composite layer is prepared by compounding the dried printing layer with the adhesive layer and the heat-seal layer, and curing.

Further, the compounding has a speed of less than or equal to 200 m/min; and during the compounding, the first drying tunnel is maintained at a temperature ranging from 50° C. to 60° C., the second drying tunnel is maintained at a temperature ranging from 65° C. to 85° C., and the third drying tunnel is maintained at a temperature ranging from 75° C. to 90° C., and after the compounding is completed, the curing is carried out at a temperature ranging from 40° C. to 50° C. for a curing time of greater than or equal to 48 h.

The technical solution of the present invention has the following advantages:

1. The dehumidification bag provided by the present application comprises: a bag body, comprising a first side sheet and a second side sheet, wherein the side sheet comprises a air-permeability film and/or a composite film, wherein, part or all of at least one side sheet is the air-permeability film; and a moisture-proof layer, covering an outside of the air-permeability film. The dehumidification bag in the present application is provided with an air-permeability film on the bag body, and the outer surface of the air-permeability film is covered with a moisture-proof layer and heat-sealed, so that the air-permeability film and the moisture-proof layer are in close contact without moisture absorption, which effectively prevents contacting between the air-permeability film and the moisture-proof layer, causing the effect of the dehumidifier to deteriorate or lose during transportation and storage process. The moisture-proof layer is tearable, when a buyer uses it, the moisture-proof layer can be torn off, which is convenient and fast. In addition, since humidity is heavier than air, the humidity will move downwards, so the bottom of the wardrobe or cabinet is the gathering point of humidity. Existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect.

2. The dehumidification bag provided by the present application can achieve self-standing by providing a bottom sheet. The bottom sheet can be a horizontal support structure in any shape at the bottom of existing self-standing bag, so that the bag can stand on its own without relying on any support.

3. The dehumidification bag provided by the present application is provided with an openable and closable sealing structure. After dehumidizier in the dehumidification bag loses effect, the purchaser can open it and replace it with a new dehumidifier, and then close the self-sealing structure to continue using, thus achieving the effect of reuse, saving cost and energy.

4. The dehumidification bag provided by the present application limits the air-permeability film being a non-woven fabric or Tyvek; both non-woven fabric and Tyvek have good air permeability without leaking water and allow water vapor in the air to permeate, which can be adsorbed by the dehumidifier in the bag, thus achieving the purpose of dehumidification. Even if the dehumidification bag is inverted, water in the bag will not flow out because the air-permeability film is impermeable for water. By limiting that the moisture-proof layer comprises a reinforcing layer and a barrier layer; the barrier layer is a thin film layer of polyethylene terephthalate; the reinforcement layer is an aluminum foil layer, a polyester coated aluminum film layer or a thin film layer formed of polyethylene terephthalate, the heat-sealing strength of the moisture-proof layer and the air-permeable and water-impermeable layer can be maintained at 5 N/15 mm to 20 N/15 mm, so that the moisture-proof layer not only has good contact with the air-permeability film, but also is easily tearable and convenient for use.

5. By limiting the thickness of the barrier layer, the dehumidification bag provided by the present application can improve the moisture-proof effect during transportation or storage, that is, can improve the sealing effect of the moisture-proof layer and the air permeability layer.

6. The dehumidification bag provided by the present invention can further improve the sealing effect of the moisture-proof layer and the air permeability layer by limiting the layer structure of the composite film and the thickness of each layer.

7. In the dehumidification bag provided by the present application, a structure for tearing off the moisture-proof layer easily is arranged to extend from a heat-sealed position on the moisture-proof layer, which is more convenient for buyers to tear off the moisture-proof layer.

8. The method for preparing a dehumidification bag provided by the present application comprises the following steps: heat-sealing a moisture-proof layer with a first side sheet and a second side sheet to obtain a dehumidification bag, wherein, the side sheet consists of a permeability film and/or a composite film, part or all of at least one side sheet is an air-permeability film; and the moisture-proof layer is located on the outside of the air-permeability film.

By covering a moisture-proof layer outside of the air-permeability film, the air-permeability film and the moisture-proof layer in the obtained dehumidification bag are in close contact without moisture absorption, which effectively prevents contacting between the air-permeability film and the moisture-proof layer, causing the effect of the dehumidifier to deteriorate or lose effect during transportation and storage process, and the moisture-proof layer is tearable. When a buyer uses it, the moisture-proof layer can be torn off, which is convenient and fast. In addition, since humidity is heavier than air, the humidity will move downwards, so the bottom of the wardrobe or cabinet is the gathering point of humidity. Existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect. Furthermore, the method for preparing a dehumidification bag provided by the present application is simple and convenient, and just needs heat sealing, thus saving materials.

9. The method for preparing a dehumidification bag provided by the present application can realize self-standing by heat-sealing the moisture-proof layer, the bottom sheet, the first side sheet and the second side sheet to form a bag body with a storage compartment.

10. The method for preparing a dehumidification bag provided by the present application limits the temperature and time of heat-sealing to prevent wrinkles, small bubbles or delamination at the heat-sealed position after heat-sealing, thus improving the sealing effect of the moisture-proof layer and the air-permeability film of the obtained dehumidification bag, balancing the tear-off effect of the moisture-proof layer, and contacting the air-permeability film and the moisture-proof layer closely without moisture absorption, which effectively prevents contacting between the air-permeability film and the moisture-proof layer, causing the effect of the dehumidifier to deteriorate or lose during transportation and storage process. When a buyer uses it, the moisture-proof layer can be torn off, which is convenient and fast. In addition, since humidity is heavier than air, the humidity will move downwards, so the bottom of the wardrobe or cabinet is the gathering point of humidity. The existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect.

11. The method for preparing a dehumidification bag provided by the present application limits the speed and temperature of the hot-seal adhesive and the coating amount of the hot-seal adhesive after drying, which can improve the uniformity of coating and further optimize the tightness and tearability of the moisture-proof layer and the air-permeability film.

12. The method for preparing a dehumidification bag provided by the present application limits the printing speed and the drying temperature, so that overprinting of the printed graphics and text are accurate, the printing ink is uniform, and the color has no obvious color difference.

13. In the method for preparing a dehumidification bag provided by the present application, by limiting the speed and temperature during compounding, the laminating temperature, and the curing temperature and curing time after the compounding is completed, the firmness and strength of the composite can be improved and solvent residue is prevented from exceeding the standard, there isn't strange smells, and is environmentally friendly and healthy.

BRIEF DESCRIPTION OF THE DRAWINGS

To describe the technical solution in the specific embodiments of the present invention more clearly, a brief introduction will be given below on the accompanying drawings required to be used in the specific embodiments. Apparently, the accompanying drawings described below are some embodiments of the present invention. For those skilled in the art, other accompanying drawings can be obtained based on these accompanying drawings without any creative effort.

Figure 1:
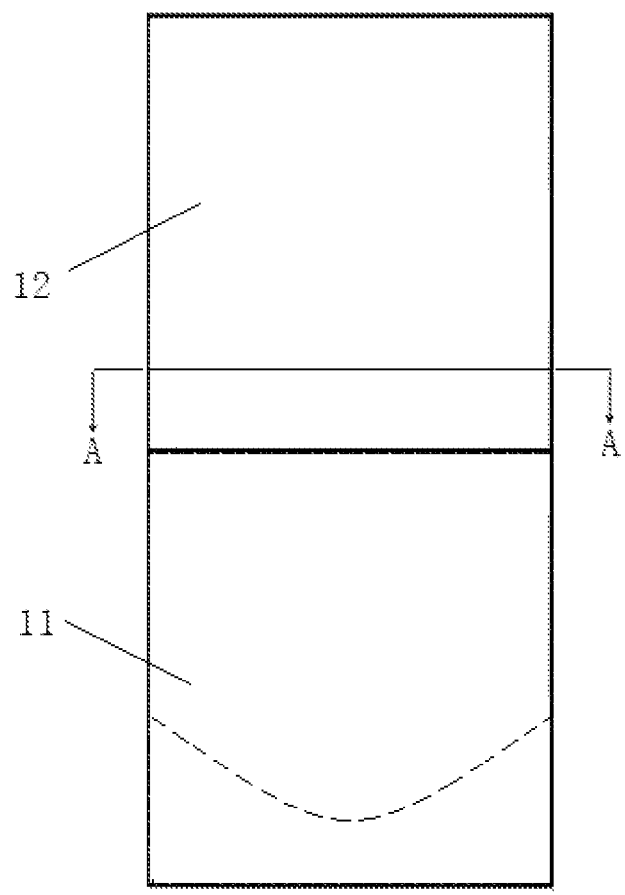
FIG. 1 is a front view of the dehumidification bag in Embodiment 1 of the present application.
Figure 2:
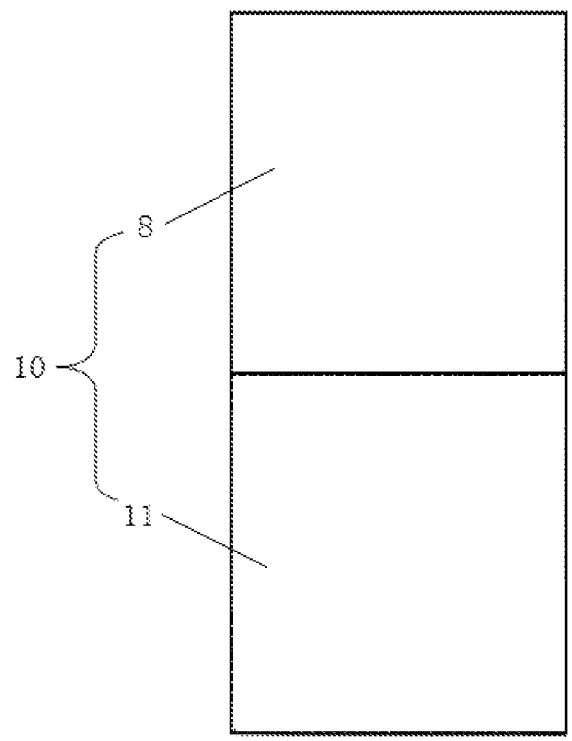
FIG. 2 is a schematic diagram of the second side sheet in Embodiment 1 of the present application.
Figure 3:
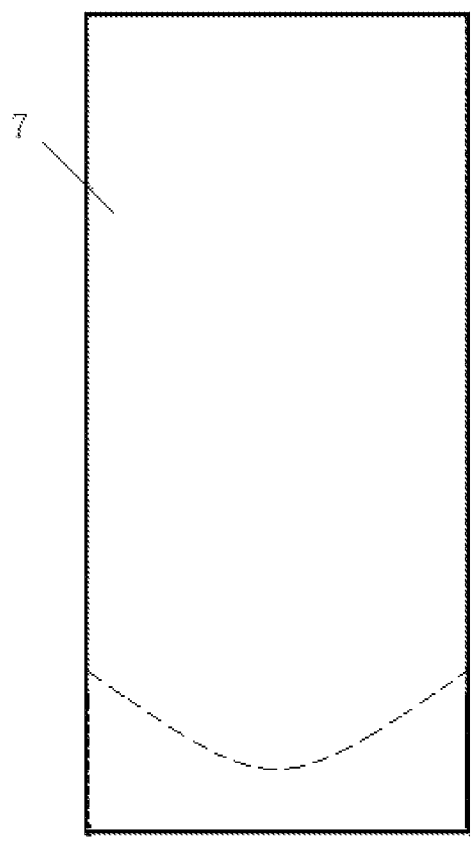
FIG. 3 is a rear view of the dehumidification bag in Embodiment 1 of the present application.
Figure 4:
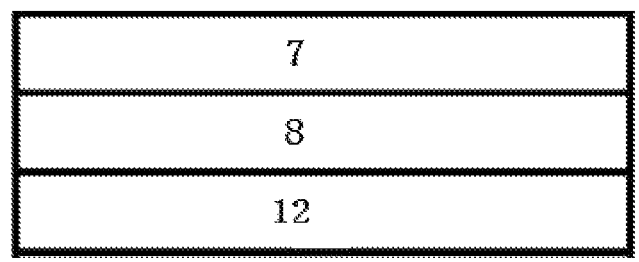
FIG. 4 is a cross-sectional view of A-A section in FIG. 1.
Figure 5:
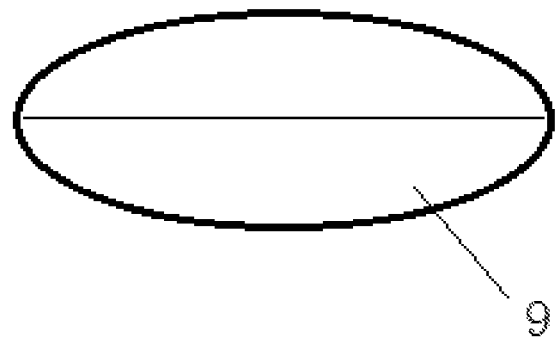
FIG. 5 is a bottom view of the dehumidification bag in Embodiment 1 of the present application.
Figure 6:
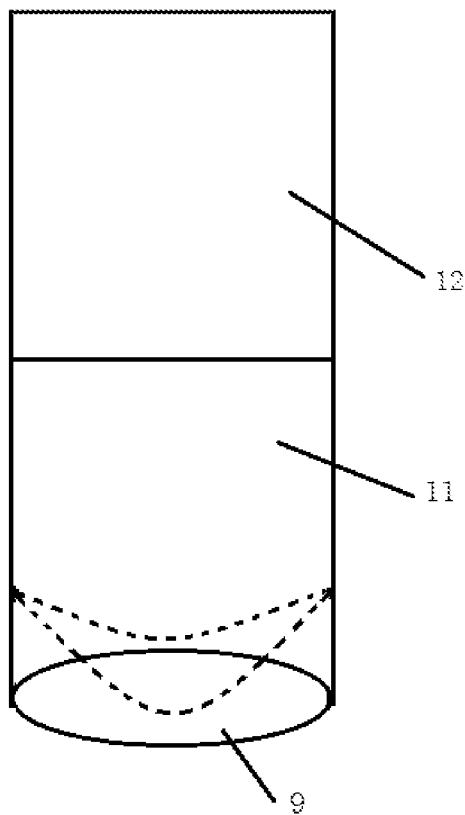
FIG. 6 is a schematic diagram of the three-dimensional structure of the dehumidification bag in Embodiment 1 of the present application.

The reference signs are as follows:
1-barrier layer; 2-reinforcing layer; 3-heat-seal layer; 4-adhesive layer; 5-ink layer; 6-printing layer; 7-first side sheet; 8-air-permeability film; 9-bottom sheet; 10-second side sheet; 11-second composite film; 12-moisture-proof layer; 13-openable and closable zipper.

DETAILED DESCRIPTION OF THE EMBODIMENTS

The following embodiments are provided for better understanding of the present application, which are not limited to the best embodiment, and do not means to limit the content and protection scope of the present application.

Any product identical or similar to the present application obtained by combining the features of other prior art and those of the present application shall fall within the protection scope of the present application.

If specific experimental steps or conditions are not specified in the embodiments, it can be carried out according to the conventional experimental steps described in the prior art. The reagents or instruments used without indicating the manufacturers are all conventional reagent products that are commercially available.

Embodiment 1

A dehumidification bag, as shown in FIGS. 1-8, comprises:
- a bag body, comprising a first side sheet 7, a second side sheet 10, and a bottom sheet 9, wherein, the first side sheet 7 is composed of a first composite film, the second side sheet 10 comprises an air-permeability film 8 and a second composite film 11; the bottom sheet 9 is composed of a third composite film; and the first composite film, the second composite film 11, and the third composite film have the same structure and composition;
- a storage compartment formed by heat sealing the first side sheet 7, the second side sheet 10 and the bottom sheet 9; and
- a moisture-proof layer 12, covering a side of the air-permeability film 8 away from the storage compartment.

By providing an air-permeability film on the bag body, and heat sealing an outer surface of the air-permeability film with a moisture-proof layer, the air-permeability film and the moisture-proof layer are in close contact without moisture absorption, which effectively prevents contacting between the air-permeability film and the moisture-proof layer, causing the effect of the dehumidifier to deteriorate or lose during transportation and storage process. The moisture-proof layer is tearable, when a buyer uses it, the moisture-proof layer can be torn off, which is convenient and fast. By providing a bottom sheet, the dehumidification bag can stand on its own only relying on the bottom sheet without any other support. In addition, since humidity is heavier than air, the humidity will move downwards, so the bottom of the wardrobe or cabinet is the gathering point of humidity. The existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect.

Figure 7:
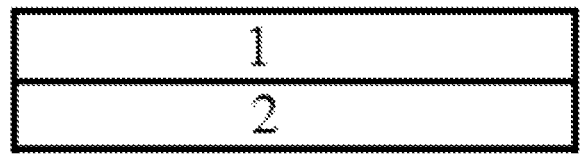
FIG. 7 is a schematic diagram of the moisture-proof layer in Embodiment 1 of the present application.

As shown in FIG. 7, the moisture-proof layer 12 comprises a barrier layer 1 (a thin film layer formed of polyethylene terephthalate is used in this embodiment) and a reinforcing layer 2 (an aluminum foil layer is used in this embodiment).

The air-permeability film 8 is a non-woven fabric that is air-permeable and water-impermeable. Even if the dehumidification bag is inverted, water in the bag will not flow out.

Figure 8:
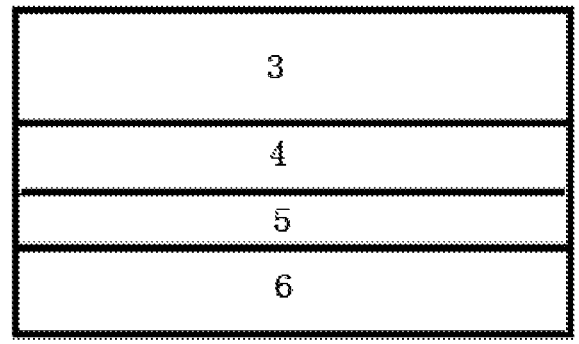
FIG. 8 is a schematic diagram of the second composite film in Embodiment 1 of the present application.

As shown in FIG. 8, the first composite film, the second composite film 11, and the third composite film are all composed of the following composite layers from inside to outside: a heat-seal layer 3 (polyethylene layer is used in this embodiment), an adhesive layer 4, an ink layer 5 and a printing layer 6 (a thin film layer formed of polyethylene terephthalate is used in this embodiment).

By using the above-mentioned materials, the moisture-proof layer not only has good contact with the air-permeability film, but also is easy to be torn off, which is convenient for use.

The barrier layer 1 has a thickness ranging from 12 μm to 50 μm (30 μm in this embodiment).

The sealing effect of the moisture-proof layer and the air-permeability film can be improved by limiting the thickness of the barrier layer.

The adhesive layer 4 has a thickness ranging from 1 μm to 3 μm (3 μm in this embodiment). The ink layer 5 has a thickness of less than 3 μm (2 μm in this embodiment).

The heat-seal layer 3 has a thickness ranging from 30 μm to 150 μm (55 μm in this embodiment).

The printing layer 6 has a thickness ranging from 12 μm to 50 μm (30 μm in this embodiment).

By limiting the layer structure of the composite film and the thickness of each layer, the times of recycling the dehumidification bag can be increased and energy can be saved.

The air-permeability film 8 and the second composite film 11 are overlapped together by heat-sealing.

As an alternative embodiment, the reinforcing layer 2 may also be a polyester coated aluminum film layer, or a thin film layer formed of an aluminium foil and polyethylene terephthalate.

As another alternative embodiment, the air-permeability film 8 may be Tyvek.

As yet another alternative embodiment, the heat-sealing layer 3 may be a cast polypropylene layer.

As yet another alternative embodiment, the printing layer 6 may be a polyamide layer, or a thin film layer of polyethylene terephthalate and a polyamide layer.

The method for preparing the above dehumidification bag comprises the following steps:

Preparation of Composite Film:

Firstly, a gravure printing machine is used to print a text pattern (that is, the ink layer 5) on the inner side of the printing layer 6 with a printing speed of 100 m/min, and a drying temperature of 80° C.

Then polyurethane adhesive (that is, the adhesive layer 4) is coated on the side of the printing layer 6 where the text is printed at a coating speed of 160 m/min.

After that, the side of the printing layer 6 coated with polyurethane adhesive is compounded with the heat-seal layer 3 at a compounding speed of 160 m/min. During compounding, the first drying tunnel is maintained at a temperature of 50° C., the second drying tunnel is maintained at a temperature of 65° C., the third drying tunnel is maintained at a temperature of 75° C., and the laminating temperature is 50° C.

After the compounding is completed, curing is carried out at a temperature of 45° C. for 48 h in a curing chamber to obtain a composite film.

Preparation of Moisture-Proof Layer:

Firstly, a gravure printing machine is used to print a text pattern on the inner side of the barrier layer 1 with a printing speed of 100 m/min, and a drying temperature of 80° C.

Then the side of the barrier layer 1 printed with the text pattern is compounded with the reinforcing layer 2 at a compounding speed of 160 m/min. During compounding, the first drying tunnel is maintained at a temperature of 50° C., the second drying tunnel is maintained at a temperature of 65° C., the third drying tunnel is maintained at a temperature of 75° C., and the laminating temperature is 50° C.

After the compounding is completed, curing is carried out at a temperature of from 45° C. for 48 h in a curing chamber to obtain a moisture-proof layer.

Coating:

Hot-seal adhesive is coated on the side of the reinforcing layer 2 of the moisture-proof layer 12 under the following conditions: speed of coating the hot-seal adhesive is 160 m/min; the first drying tunnel is maintained at a temperature of 70° C., the second drying tunnel is maintained at a temperature of 80° C., and the third drying tunnel is maintained at a temperature of from 90° C., and the coating amount of the hot-seal adhesive after drying is 3 g/m².

Cutting:

The composite film 11, the coated moisture-proof layer 12 and the air-permeability film 8 are cut respectively according to the specifications to obtain roll materials having the required width: the first side sheet 7, the second composite film 11, the moisture-proof layer 12, the air-permeability film 8 and the bottom sheet 9.

Heat Sealing:

Firstly, the cutted air-permeability film 8 and the second composite film 11 are partially overlapped to form a second side sheet 10, and the overlapped portion of the air-permeability film 8 is located inside of the second composite film 11. Then one side of the moisture-proof layer 12 coated with hot-seal adhesive is covered with the air-permeability film 8. The moisture-proof layer 12 at the overlapped portion of the air-permeability film 8 and the second composite film 11 is located outside the second composite film 11, then overlapped portion of the moisture-proof layer 12, the air-permeability film 8 and the second composite film 11 is subjected to transverse heat-sealing at a temperature of 180° C. for 0.5 s.

Afterwards, the bottom sheet 9 is subjected to transverse heat-sealing with the first side sheet 7 and the second composite film 11 respectively at a temperature of 150° C. for 0.8 s.

Finally, the second side sheet 10 and the first side sheet 7, the moisture-proof layer 12 and the bottom sheet 9 are subjected to longitudinal heat-sealing on two sides at a temperature of 220° C. for 0.5 s to form two side heat-sealing edges, so as to obtain a bag having a storage compartment. When subjected to longitudinal heat-sealing, the moisture-proof layer 12 is located on one side of the air-permeability film 8 away from the first side sheet 7. The bottom sheet 9 is fixed between the first side sheet 7 and the second side sheet 10 to form bottom of the dehumidification bag. A storage compartment for holding the dehumidifier is formed between the first side sheet 7, the second side sheet 10 and the bottom sheet 9.

Finally, a dehumidification bag is obtained by cutting.

After the moisture-proofing agent is fed into the dehumidification bag, the end of the first side sheet 7 and the second side sheet 10 away from the bottom sheet 9 can be heat sealed.

The heat-sealing strength of the moisture-proof layer and the air-permeability film of the obtained dehumidification bag is tested, and the heat-sealing strength is 18 N/15 mm Embodiment 2

A dehumidification bag, as shown in FIG. 7, comprises:

a bag body, comprising a first side sheet 7, a second side sheet 10, and a bottom sheet 9, wherein, the first side sheet 7 is composed of a first composite film, the bottom sheet 9 is composed of a third composite film, the second side sheet 10 is an air-permeability film 8; and the first composite film and the third composite film have the same structure and composition;

a storage compartment formed by heat sealing the first side sheet 7, the second side sheet 10 and the bottom sheet 9; and a moisture-proof layer 12, covering a side of the air-permeability film 8 away from the storage compartment. A structure for tearing off the moisture-proof layer 12 easily is arranged to extend from a heat-sealed position on the moisture-proof layer, which can be square, rectangular, arc-shaped, oval, etc. (arc-shaped is used in this embodiment).

By providing an air-permeability film on the bag body, covering and heat sealing an outer surface of the air-permeability film with a moisture-proof layer, the air-permeability film and the moisture-proof layer are in close contact without moisture absorption, which effectively prevents contacting between the air-permeability film and the moisture-proof layer, causing the effect of the dehumidifier to deteriorate or lose during transportation and storage process. By providing the moisture-proof layer as tearable, when a buyer uses it, the moisture-proof layer can be torn off, which is convenient and fast. In addition, since humidity is heavier than air, the humidity will move downwards, so the bottom of the wardrobe or cabinet is the gathering point of humidity. The existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect.

The moisture-proof layer 12 comprises a barrier layer 1 (a polyethylene terephthalate thin film layer is used in this embodiment) and a reinforcing layer 2 (an aluminized polyester film layer is used in this embodiment).

The air-permeability film 8 is a Tyvek that is air-permeable and water-impermeable. Even if the dehumidification bag is inverted, water in the bag will not flow out.

Both the first composite film and the third composite film are composed of the following composite layers from inside to outside: a heat-seal layer 3 (polyethylene layer is used in this embodiment), an adhesive layer 4, an ink layer 5 and a printing layer 6 (a thin film layer formed of polyethylene terephthalate is used in this embodiment).

By using the above-mentioned materials, the moisture-proof layer not only has good contact with the air-permeability film, but also is easy to be torn off, which is convenient for use.

The barrier layer 1 has a thickness ranging from 12 μm to 50 μm (50 μm in this embodiment). The sealing effect of the moisture-proof layer and the air-permeability film can be improved by limiting the thickness of the barrier layer.

The adhesive layer has a thickness ranging from 1 μm to 3 μm (2 μm in this embodiment). The ink layer has a thickness of less than 3 μm (3 μm in this embodiment).

The heat-seal layer 3 has a thickness ranging from 30 μm to 150 μm (150 μm in this embodiment).

The printing layer 6 has a thickness ranging from 12 μm to 50 μm (12 μm in this embodiment).

By limiting the layer structure of the composite film and the thickness of each layer, the times of recycling the dehumidification bag can be increased and energy can be saved.

As an alternative embodiment, the reinforcing layer 2 may also be an aluminium foil, or a thin film layer formed of an aluminium foil and polyethylene terephthalate.

As another alternative embodiment, the air-permeability film 8 may be non-woven fabric.

As yet another alternative embodiment, the heat-sealing layer 3 may be a cast polypropylene layer.

As yet another alternative embodiment, the printing layer 6 may be a polyamide layer, or a thin film layer of polyethylene terephthalate and a polyamide layer.

The method for preparing the above dehumidification bag comprises the following steps:

Preparation of Composite Film:

Firstly, a gravure printing machine is used to print a text pattern (that is, the ink layer 5) on the inner side of the printing layer 6 with a printing speed of 30 m/min, and a drying temperature of 40° C.

Then polyurethane adhesive (that is, the adhesive layer 4) is coated on the side of the printing layer 6 where the text is printed at a coating speed of 180 m/min.

After that, the side of the printing layer 6 coated with polyurethane adhesive is compounded with the heat-seal layer 3 at a compounding speed of 180 m/min. During compounding, the first drying tunnel is maintained at a temperature of 60° C., the second drying tunnel is maintained at a temperature of 85° C., the third drying tunnel is maintained at a temperature of 90° C., and the laminating temperature is 70° C.

After the compounding is completed, curing is carried out at a temperature of 50° C. for 60 h in a curing chamber to obtain a composite film.

Preparation of Moisture-Proof Layer:

Firstly, a gravure printing machine is used to print the text pattern on the inner side of the barrier layer 1 with a printing speed of 300 m/min, and a drying temperature of 40° C.

The side of the barrier layer 1 printed with the text pattern is compounded with the reinforcing layer 2 at a compounding speed of 180 m/min. During compounding, the first drying tunnel is maintained at a temperature of 60° C., the second drying tunnel is maintained at a temperature of 85° C., the third drying tunnel is maintained at a temperature of 90° C., and the laminating temperature is 70° C.

After the compounding is completed, curing is carried out at a temperature of from 50° C. for 60 h in a curing chamber to obtain a moisture-proof layer.

Coating:

Hot-seal adhesive is coated on the side of the reinforcing layer 2 of the moisture-proof layer 12 under the following conditions: speed of coating the hot-seal adhesive is 200 m/min; the first drying tunnel is maintained at a temperature of 90° C., the second drying tunnel is maintained at a temperature of 120° C., and the third drying tunnel is maintained at a temperature of from 150° C., and the coating amount of the hot-seal adhesive after drying is 6 g/m$^2$.

Cutting:

The composite film 11, the coated moisture-proof layer 12 and the air-permeability film 8 are cut respectively according to the specifications to obtain roll materials having the required width: the first side sheet 7, the second side sheet 10 (air-permeability film 8), the moisture-proof layer 12 and the bottom sheet 9.

Heat Sealing:

Firstly, the cutted first side sheet 7 and the bottom sheet 9 are subjected to transverse heat-sealing at a temperature of 220° C. for 0.5 s.

Then the moisture-proof layer 12, the second side sheet 10 (air-permeability film 8), and the bottom sheet 9 are subjected to transverse heat-sealing at a temperature of 140° C. for 1 s. During heat-sealing, one side of the moisture-proof layer 12 coated with hot-seal adhesive is covered with the second side sheet 10 (air-permeability film 8).

Afterwards, the first side sheet 7, the second side sheet 10 (air-permeability film 8), the moisture-proof layer 12 and the bottom sheet 9 are subjected to longitudinal heat-sealing on two sides at a temperature of 150° C. for 1 s to form two side heat-sealing edges, so as to obtain a bag having a storage compartment. When subjected to longitudinal heat-sealing, the side of the second side sheet 10 (air-permeability film 8) away from the storage compartment covers the moisture-proof layer 12. The bottom sheet 9 is fixed between the first side sheet 7 and the second side sheet 10 to form bottom of the dehumidification bag. A storage compartment for holding the dehumidifier is formed between the first side sheet 7, the second side sheet 10 and the bottom sheet 9.

Finally, a dehumidification bag is obtained by cutting. During cutting, a structure for tearing off the moisture-proof layer 12 easily is arranged to extend from a heat-sealed position on the moisture-proof layer, which can be square, rectangular, arc-shaped, oval, etc. (arc-shaped is used in this embodiment).

After the moisture-proofing agent is fed into the dehumidification bag, the first side sheet 7 and the end of the second side sheet 10 away from the bottom sheet 9 can be heat sealed.

The heat-sealing strength of the moisture-proof layer and the air-permeability film of the obtained dehumidification bag is tested, and the heat-sealing strength is 12 N/15 mm Embodiment 3

A dehumidification bag, comprises:

a bag body, comprising a first side sheet 7 and a second side sheet 10, the first side sheet 7 is composed of a first composite film, and the second side sheet 10 is composed of a air-permeability film 8;

a storage compartment formed by heat sealing the first side sheet 7 and the second side sheet 10; and a moisture-proof layer 12, covering the side of the second side sheet 10 (air-permeability film 8) away from the storage compartment.

Figure 9:
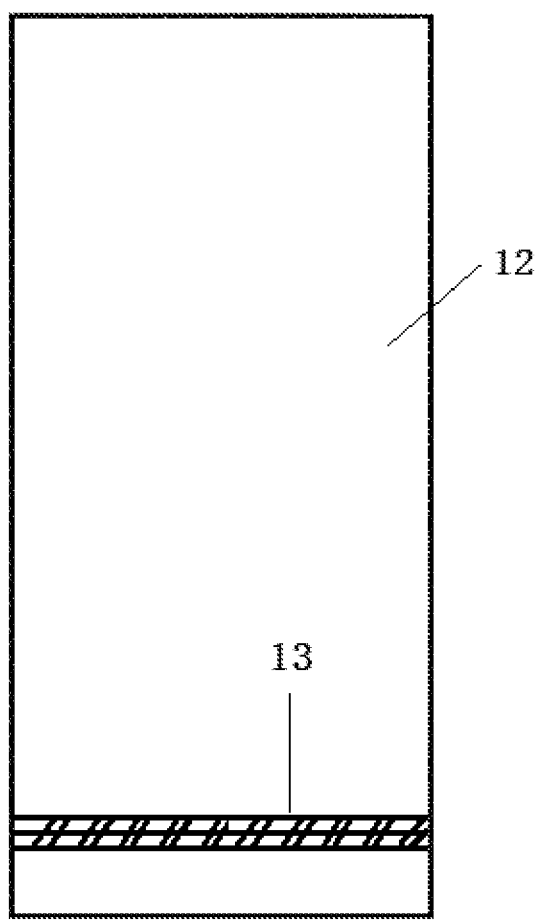
FIG. 9 is a front view of the dehumidification bag in Embodiment 3 of the present application.

As shown in FIG. 9, a lower end of the bag body is provided with an openable and closable zipper 13, and the length of the zipper is not less than the width of the upper end opening of the bag body (the length of the zipper in this embodiment is the same as the width of the upper end opening of the bag body).

By providing an air-permeability film on the bag body, covering and heat sealing an outer surface of the air-permeability film with a moisture-proof layer, the air-permeability film and the moisture-proof layer are in close contact without moisture absorption, which effectively prevents contacting between the air-permeability film and the moisture-proof layer, causing the effect of the dehumidifier to deteriorate or lose during transportation and storage process. By providing the moisture-proof layer as tearable, when a buyer uses it, the moisture-proof layer can be torn off, which is convenient and fast. In addition, since humidity is heavier than air, the humidity will move downwards, so the bottom of the wardrobe or cabinet is the gathering point of humidity. The existing dehumidification bag is hung on the clothes rail in the wardrobe by hooks, that is, the top of the wardrobe, thus resulting in poor dehumidification effect. The dehumidification bag provided by the present application can be placed at the bottom of a wardrobe or cabinet without a hook, and has a good dehumidification effect.

The moisture-proof layer 12 comprises a barrier layer 1 (a thin film layer formed of polyethylene terephthalate is used in this embodiment) and a reinforcing layer 2 (an aluminum foil layer is used in this embodiment).

The air-permeability film 8 is a non-woven fabric that is air-permeable and water-impermeable. Even if the dehumidification bag is inverted, water in the bag will not flow out.

The first composite film is composed of the following composite layers from inside to outside: a heat-seal layer 3 (polyethylene layer is used in this embodiment), an adhesive layer 4, an ink layer 5 and a printing layer 6 (a thin film layer formed of polyethylene terephthalate is used in this embodiment).

By using the above-mentioned materials, the moisture-proof layer not only has good contact with the air-permeability film, but also is easy to be torn off, which is convenient for use.

The barrier layer 1 has a thickness ranging from 12 μm to 50 μm (12 μm in this embodiment). The sealing effect of the moisture-proof layer and the air-permeability film can be improved by limiting the thickness of the barrier layer.

The adhesive layer has a thickness ranging from 1 μm to 3 μm (3 μm in this embodiment). The ink layer has a thickness of less than 3 μm (1 μm in this embodiment).

The heat-seal layer 3 has a thickness ranging from 30 μm to 150 μm (30 μm in this embodiment).

The printing layer 6 has a thickness ranging from 12 μm to 50 μm (50 μm in this embodiment).

By limiting the layer structure of the composite film and the thickness of each layer, the times of recycling the dehumidification bag can be increased and energy can be saved.

The end of the bag body is provided with an openable and closable zipper seal.

As an alternative embodiment, the reinforcing layer 2 may also be a polyester coated aluminum film layer, or a thin film layer formed of an aluminium foil and polyethylene terephthalate.

As another alternative embodiment, the air-permeability film 8 may be Tyvek.

As yet another alternative embodiment, the heat-sealing layer 3 may be a cast polypropylene layer.

As yet another alternative embodiment, the printing layer 6 may be a polyamide layer, or a thin film layer of polyethylene terephthalate and a polyamide layer.

The method for preparing the above dehumidification bag comprises the following steps:

Preparation of Composite Film:

Firstly, a gravure printing machine is used to print a text pattern (that is, the ink layer 5) on the inner side of the printing layer 6 with a printing speed of 200 m/min, and a drying temperature of 60° C.

Then polyurethane adhesive (that is, the adhesive layer 4) is coated on the side of the printing layer 6 where the text is printed at a coating speed of 200 m/min.

After that, the side of the printing layer 6 coated with polyurethane adhesive is compounded with the heat-seal layer 3 at a compounding speed of 200 m/min. During compounding, the first drying tunnel is maintained at a temperature of 60° C., the second drying tunnel is maintained at a temperature of 75° C., the third drying tunnel is maintained at a temperature of 80° C., and the laminating temperature is 60° C.

After the compounding is completed, curing is carried out at a temperature of 40° C. for 48 h in a curing chamber to obtain a composite film.

Preparation of Moisture-Proof Layer:

Firstly, a gravure printing machine is used to print a text pattern on the inner side of the barrier layer 1 with a printing speed of 200 m/min, and a drying temperature of 60° C.

Then the side of the barrier layer 1 printed with the text pattern is compounded with the reinforcing layer 2 at a compounding speed of 200 m/min. During compounding, the first drying tunnel is maintained at a temperature of 60° C., the second drying tunnel is maintained at a temperature of 75° C., the third drying tunnel is maintained at a temperature of 80° C., and the laminating temperature is 60° C.

After the compounding is completed, curing is carried out at a temperature of from 40° C. for 48 h in a curing chamber to obtain a moisture-proof layer.

Coating:

Hot-seal adhesive is coated on the side of the reinforcing layer 2 of the moisture-proof layer 12 under the following conditions: speed of coating the hot-seal adhesive is 180 m/min; the first drying tunnel is maintained at a temperature of 80° C., the second drying tunnel is maintained at a temperature of 100° C., and the third drying tunnel is maintained at a temperature of from 120° C., and the coating amount of the hot-seal adhesive after drying is 5

Cutting:

The composite film 11, the coated moisture-proof layer 12 and the air-permeability film 8 are cut respectively according to the specifications to obtain roll materials having the required width: the first side sheet 7, the second side sheet 10 (air-permeability film 8) and the moisture-proof layer 12.

Heat Sealing:

Firstly, the lower ends of the cutted first side sheet 7, the second side sheet 10 and the moisture-proof layer 12 are subjected to transverse heat-sealing to form an openable and closeable sealing structure (an openable and closeable zipper 13 is used in this embodiment), and the length of the zipper is the same as the opening at the upper end of the bag. The heat-sealing is carried out at a temperature of 130° C. for 1 s. During transverse heat sealing, the second side sheet 10 (air-permeability film) is located between the moisture-proof layer 12 and the first side sheet 7, and the side of the moisture-proof layer 12 coated with hot-seal adhesive is in contact with the second side sheet 10 (air-permeability film).

Afterwards, the first side sheet 7, the second side sheet 10 (air-permeability film 8) and the moisture-proof layer 12 are subjected to longitudinal heat-sealing on two sides at a temperature of 180° C. for 0.8 s to form two side heat-sealing edges, so as to obtain a bag having a storage compartment. A storage compartment for holding the dehumidifier is formed between the first side sheet 7 and the second side sheet 10.

After the moisture-proofing agent is fed into the dehumidification bag, the first side sheet 7, the second side sheet 10, and the other end of the moisture-proof layer 12 can be heat sealed.

The heat-sealing strength of the moisture-proof layer and the air-permeability film of the obtained dehumidification bag is tested, and the heat-sealing strength is 10 N/15 mm Comparative Example 1

The difference between comparative example 1 and embodiment 1 only lies in heat-sealing temperature: firstly, the cutted air-permeability film 8 and the second composite film 11 are partially overlapped to form a second side sheet 10, and the overlapped portion of the air-permeability film 8 is located inside of the second composite film 11. Then one side of the moisture-proof layer 12 coated with hot-seal adhesive is covered with an air-permeability film 8. The moisture-proof layer 12 at the overlapped portion of the air-permeability film 8 and the second composite film 11 is located outside the second composite film 11, then overlapped portion of the moisture-proof layer 12, the air-permeability film 8 and the second composite film 11 is subjected to transverse heat-sealing at a temperature of 110° C. for 0.5 s.

Afterwards, the bottom sheet 9 is subjected to transverse heat-sealing with the first side sheet 7 and the second composite film 11 respectively at a temperature of 150° C. for 0.8 s.

Finally, the second side sheet 10 and the first side sheet 7, the moisture-proof layer 12 and the bottom sheet 9 are subjected to longitudinal heat-sealing on two sides at a temperature of 110° C. for 0.5 s to form two side heat-sealing edges, so as to obtain a bag having a storage compartment. When subjected to longitudinal heat-sealing, the moisture-proof layer 12 is located on one side of the air-permeability film 8 away from the first side sheet 7. The bottom sheet 9 is fixed between the first side sheet 7 and the second side sheet 10 to form bottom of the dehumidification bag. A storage compartment for holding the dehumidifier is formed between the first side sheet 7, the second side sheet 10 and the bottom sheet 9.

The heat-sealing strength of the moisture-proof layer and the air-permeability film of the obtained dehumidification bag is tested, and the heat-sealing strength is 13 N/15 mm Comparative Example 2

The difference between comparative example 1 and embodiment 1 only lies in heat-sealing temperature: firstly, the cutted air-permeability film 8 and the second composite film 11 are partially overlapped to form a second side sheet 10, and the overlapped portion of the air-permeability film 8 is located inside of the second composite film 11. Then one side of the moisture-proof layer 12 coated with hot-seal adhesive is covered with a air-permeability film 8. The moisture-proof layer 12 at the overlapped portion of the air-permeability film 8 and the second composite film 11 is located outside the second composite film 11, then overlapped portion of the moisture-proof layer 12, the air-permeability film 8 and the second composite film 11 is subjected to transverse heat-sealing at a temperature of 250° C. for 0.5 s.

Afterwards, the bottom sheet 9 is subjected to transverse heat-sealing with the first side sheet 7 and the second composite film 11 respectively at a temperature of 150° C. for 0.8 s.

Finally, the second side sheet 10 and the first side sheet 7, the moisture-proof layer 12 and the bottom sheet 9 are subjected to longitudinal heat-sealing on two sides at a temperature of 250° C. for 0.5 s to form two side heat-sealing edges, so as to obtain a bag having a storage compartment. When subjected to longitudinal heat-sealing, the moisture-proof layer 12 is located on one side of the air-permeability film 8 away from the first side sheet 7. The bottom sheet 9 is fixed between the first side sheet 7 and the second side sheet 10 to form bottom of the dehumidification bag. A storage compartment for holding the dehumidifier is formed between the first side sheet 7, the second side sheet 10 and the bottom sheet 9.

The heat-sealing strength of the moisture-proof layer and the air-permeability film of the obtained dehumidification bag is tested, and the heat-sealing strength is 30 N/15 mm Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present invention.

The invention claimed is:

1. A dehumidification bag, comprising:
   a bag body, comprising a first side sheet, a second side sheet and a bottom sheet, wherein the first side sheet is composed of a composite film; the second side sheet comprises an air-permeability film and the composite film located below air-permeability film, the air-permeability film and the composite film are partially overlapped together by heat-sealing; the bottom sheet is composed of the composite film, the bottom sheet can support the bag body to achieve self-standing; wherein the air-permeability film is a non-woven fabric or spunbond polyethylene;
   a moisture-proof layer, covering all of the air-permeability film facing the outside of the bag body, for preventing the air-permeability film from contacting with the outside air, wherein the moisture-proof layer is tearable; and
   a storage compartment formed by heat-sealing the first side sheet, the second side sheet and the bottom sheet,
   wherein the bag body is provided with an openable and closeable sealing structure formed by subjecting the lower ends of the first side sheet, the second side sheet and the moisture-proof layer to transverse heat-sealing.

2. The dehumidification bag of claim 1, wherein, the moisture-proof layer comprises a reinforcing layer and a barrier layer;
   preferably, the barrier layer is a thin film layer of polyethylene terephthalate;
   the reinforcement layer is an aluminum foil layer, an aluminized polyester film layer or a thin film layer formed by aluminum foil and polyethylene terephthalate.

3. The dehumidification bag of claim 2, wherein, the barrier layer has a thickness ranging from 12 μm to 50 μm.

4. The dehumidification bag of claim 1, wherein, the composite film comprises a heat-seal layer, an adhesive layer, an ink layer, and a printing layer in sequence from inside to outside;
   preferably, the heat-seal layer is a polyethylene layer or a cast polypropylene layer; and
   the printing layer is a thin film layer of polyethylene terephthalate and/or a polyamide layer.

5. The dehumidifying bag of claim 4, wherein, the adhesive layer has a thickness ranging from 1 μm to 3 μm;
   the ink layer has a thickness of less than 3 μm;
   the heat-seal layer has a thickness ranging from 30 μm to 150 μm; and
   the printing layer has a thickness ranging from 12 μm to 50 μm.

6. The dehumidification bag of claim 1, wherein, an easy-to-pull structure is provided on the moisture-proof layer.

7. The dehumidification bag of claim 2, wherein, moisture-proof layer comprises a reinforcing layer and a barrier layer;

preferably, the barrier layer is a thin film layer of polyethylene terephthalate;

the reinforcement layer is an aluminum foil layer, an aluminized polyester film layer or a thin film layer formed by aluminum foil and polyethylene terephthalate; and the air-permeability film is a non-woven fabric or Tyvek.

8. The dehumidification bag of claim 2, wherein, the composite film comprises a heat-seal layer, an adhesive layer, an ink layer, and a printing layer in sequence from inside to outside;

preferably, the heat-seal layer is a polyethylene layer or a cast polypropylene layer; and the printing layer is a thin film layer of polyethylene terephthalate and/or a polyamide layer.

9. The dehumidification bag of claim 2, wherein, an easy-to-pull structure is provided on the moisture-proof layer.

\* \* \* \* \*